United States Patent [19]
Kumbatovic

[11] Patent Number: 5,789,826
[45] Date of Patent: Aug. 4, 1998

[54] EQUIPMENT TO EXTRACT OCEAN WAVE POWER

[76] Inventor: Bogumil Kumbatovic, 20-79 28th St., Long Island City, N.Y. 11105

[21] Appl. No.: 631,169

[22] Filed: Apr. 12, 1996

[51] Int. Cl.[6] .................................................. F03B 13/12
[52] U.S. Cl. ........................... 290/53; 60/499; 290/43; 416/6
[58] Field of Search ................... 290/53, 42, 54, 290/43; 60/398, 506; 416/6; 417/330, 334, 332; 415/3.1; 212/238; 474/100

[56] References Cited

U.S. PATENT DOCUMENTS

| | | | |
|---|---|---|---|
| 410,132 | 8/1889 | Witherell | 415/141 |
| 1,045,654 | 11/1912 | Willy | 417/330 |
| 1,202,657 | 10/1916 | Blevins | 415/7 |
| 1,289,533 | 12/1918 | Pelton | 416/6 |
| 1,439,416 | 12/1922 | Hess | 415/3.1 |
| 1,481,397 | 1/1924 | Tetetleni | 415/4.1 |
| 1,498,707 | 6/1924 | Wilcott | 416/85 |
| 2,214,541 | 9/1940 | Siegling | 474/100 |
| 3,882,320 | 5/1975 | Schmeller | 290/43 |
| 3,884,359 | 5/1975 | Suverkrop | 212/289 |
| 3,928,771 | 12/1975 | Straumsnes | 290/43 |
| 4,023,041 | 5/1977 | Chappell | 290/53 |
| 4,078,382 | 3/1978 | Ricafranca et al. | 60/398 |
| 4,137,005 | 1/1979 | Comstock | 415/24 |
| 4,301,377 | 11/1981 | Rydz | 290/43 |
| 4,514,644 | 4/1985 | Westling | 290/53 |
| 4,563,591 | 1/1986 | Jones | 290/53 |
| 4,625,124 | 11/1986 | Ching-An | 290/42 |
| 4,636,141 | 1/1987 | Sedlacek | 290/43 |
| 4,717,831 | 1/1988 | Kikuchi | 290/53 |
| 4,843,249 | 6/1989 | Bussiere | 290/53 |
| 5,311,064 | 5/1994 | Kumbatovic | 290/53 |
| 5,512,787 | 4/1996 | Dederick | 290/4 R |

FOREIGN PATENT DOCUMENTS

| | | |
|---|---|---|
| 2487-918 | 5/1982 | France . |
| 52-29547 | 5/1977 | Japan . |
| 57-157069 | 9/1982 | Japan . |

OTHER PUBLICATIONS

English language abstract of FR 2487–918.
English language abstract of JP 52–29547.
English language abstract of JP 57–157069.

*Primary Examiner*—Steven L. Stephan
*Assistant Examiner*—Nicholas Ponomarenko
*Attorney, Agent, or Firm*—Morgan & Finnegan LLP

[57] ABSTRACT

An improved system for harnessing the energy of ocean waves to produce useful energy like electricity is disclosed wherein a power generating apparatus is attached to a support structure located out of the water and on dry land. The support structure comprises a mechanical boom disposed on a base located on the shore and a moveable mounting structure provided with a plurality of hydraulic cylinders such that the power generating apparatus may be moved in all directions and placed in position in the water flow optimal for the generation of power. The power generating apparatus comprises a selectively moveable turbine unit coupled to either a power generating mechanism, such as a generator, or pumping mechanism such that the rotation of the turbine unit due to the impact of the ocean waves can be converted into useful energy. Also disclosed are means for restricting and preventing lateral sliding of a wide belt as it moves over a tank or over a two section straight conveyor having rotating drums, the wide belt and either a tank or conveyor comprising two different embodiments of the present invention.

23 Claims, 6 Drawing Sheets

"B - B"

"C - C"

5,789,826

1

EQUIPMENT TO EXTRACT OCEAN WAVE POWER

FIELD OF THE INVENTION

The present invention relates to power generators and more specifically to an improved system for converting kinetic and potential energy of ocean waves into a rotational movement for generating electricity.

BACKGROUND OF THE INVENTION

Within the past several decades, there have been many attempts to provide a system which is capable of harnessing the energy of ocean waves to produce useful energy like electricity. Since the equipment for deriving power from ocean waves must be placed in the ocean for long periods of time, there is a need for a simple system which requires minimum parts and maintenance. Furthermore, due to the fact that the water flow and its direction of impact are not constant and steady, the prior devices have not been able to derive the maximum wave energy in a very efficient manner. A further complication that is encountered when attempting to harness the energy of ocean waves is bad weather conditions with very high tides and large maverick waves. Hence, a system is necessary which is capable of withstanding such extreme weather conditions while still being able to extract power.

Attempts have been made to provide ocean wave power generators which solve the above described problems wherein the equipment is fixed to the ocean floor by means of a movable support base. Such a system is disclosed in Kumbatovic U.S. Pat. No. 5,311,064, the disclosure of which is incorporated herein reference. The moveable support base is used to optimally position the power extracting apparatus in the direction of water flow. The problem, however, with fixing the system to the ocean floor is that the support base is subject to the destructive nature of the ocean waves, thereby creating difficulties in construction and maintenance. Thus, there is a need for an ocean wave power generator which places the support base out of the water and onto dry land while still providing a means for placing the equipment in the direction of water flow for optimal power extraction.

OBJECT OF THE INVENTION

An object of the invention is to harness the ocean wave energy efficiently.

A further object of the invention is to dispose a power generating system in the most appropriate position to maximize the effect of ocean waves.

Yet another object of the invention is to set up a power generating system expeditiously and economically.

A still further object of the invention is to generate power from water flow wherein a support base for a power generating system is located out of the water and on dry land.

Additional objects, advantages and novel features of the invention will be set forth in part in the detailed description which follows, and in part will become apparent to those skilled in the art upon examination of the following or through practice of the invention.

SUMMARY OF THE INVENTION

An improved system for harnessing the energy of ocean waves to produce useful energy like electricity is disclosed wherein a power generating apparatus is attached to a support structure located out of the water and on dry land. In one embodiment, the support structure comprises a mechanical boom disposed on a concrete base fixed to the shore. In another embodiment, the support structure comprises a mechanical boom disposed on a movable vehicle such as an excavator. The support structure further comprises a movable mounting structure provided with a plurality of hydraulic cylinders such that the power generating apparatus may be moved in all directions and placed in a position in the water flow optimal for the generation of power. Such a system can be used for low head hydraulic power, as well as for the changing of tides.

The power generating apparatus comprises a turbine unit moveably mounted on a support member such that the direction of the water flow causes the rotation of the turbine unit. The turbine unit is coupled through a transmission mechanism to either a power generating mechanism, such as a generator, or a pumping mechanism such that the rotation of the turbine unit due to the impact of the ocean waves can be converted into useful energy.

In one embodiment of the invention, the power generating apparatus comprises a wide belt surrounding a tank having rotating drums movably affixed thereto. Disclosed are means for restricting the wide belt as it moves along the tank so as to avoid lateral sliding of the wide belt while not adversely effecting the transfer of power.

DETAILED DESCRIPTION

Figure 1:
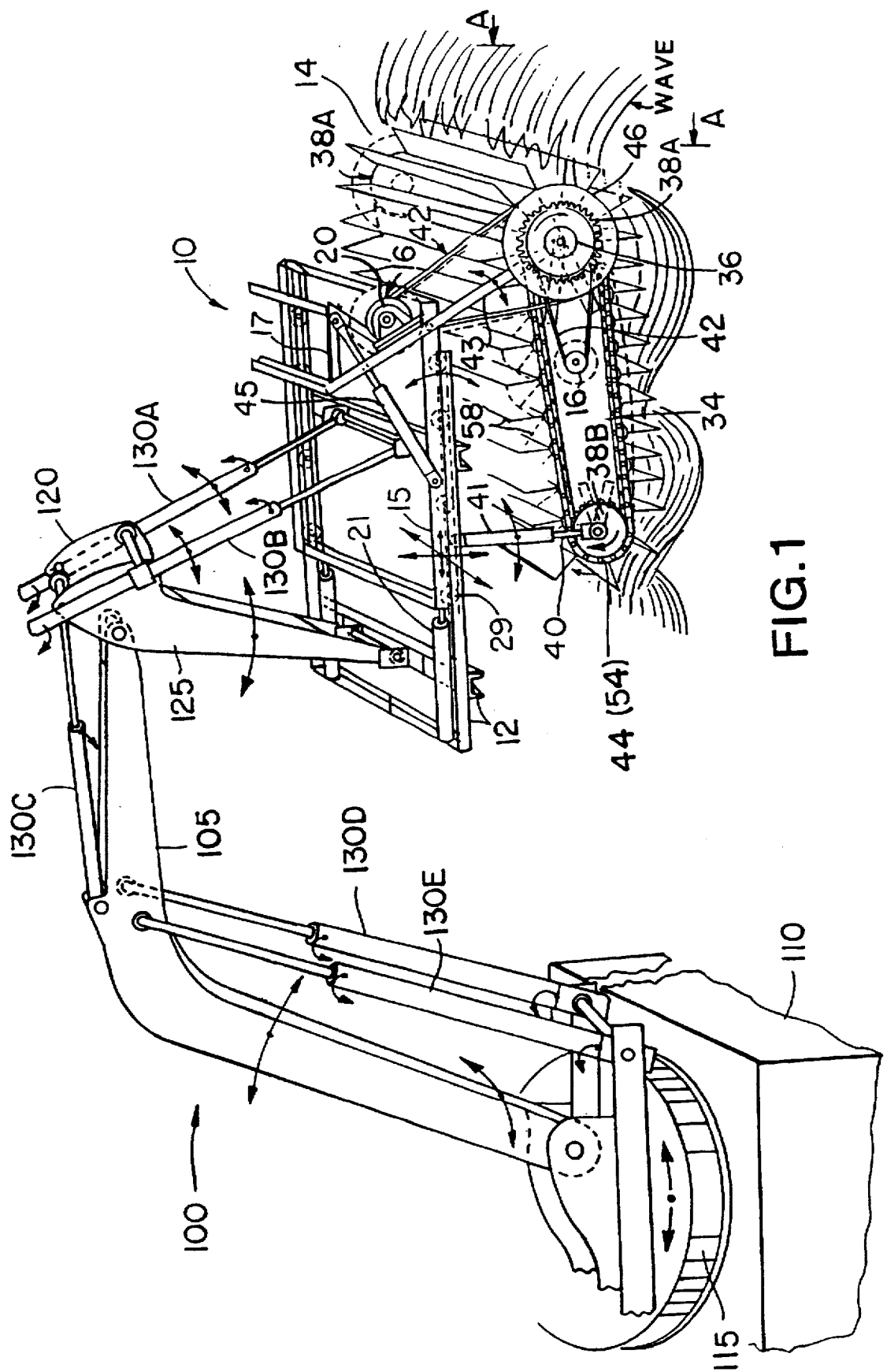
FIG. 1 is a perspective view of one embodiment of the present invention.

Referring to FIG. 1, support structure 100 is shown comprising mechanical boom 105 disposed on concrete base 110 fixed to the shore. Base 110 includes turntable 115 which allows for the rotational movement of mechanical boom 105. As shown in FIG. 1, power generating apparatus 10 is attached to mechanical boom 105 through moveable mounting structure 120. Moveable mounting structure 120 comprises mounting arm 125 and hydraulic cylinders 130A and 130B. A first end of mounting arm 125 is fixedly attached to support member 12. A second end of mounting arm 125 is rotatably attached to mechanical boom 105. Hydraulic cylinders 130A and 130B are attached between support member 12 and the second end of mounting arm 125 as shown in FIG. 1. Hydraulic cylinder 130C is connected between the second end of mounting arm 125 and an intermediate point of mechanical boom 105. Hydraulic cylinders 130D and 130E are each connected between an intermediate point of mechanical boom 105 and base 110. Thus, by rotating turntable 115 and selectively actuating hydraulic cylinder 130A, 130B, 130C, 130D and 130E, power generating apparatus 10 can be moved in all directions so as to permit optimal placement of power generating apparatus 10 in the direction of water flow. It should be apparent to one of skill in the art that, although only one mechanical boom and one moveable mounting structure are shown, multiple mechanical booms and moveable mounting structures coupled to a single turntable 115 can be utilized to support a larger sized turbine unit.

An alternate embodiment of support structure 100 places turntable 115 and mechanical boom 105 on a readily moveable vehicle such as an excavator rather than on concrete base 110 fixed to the shore. Such an embodiment provides the added benefit of allowing the entire apparatus to be easily moved from one location to another.

Power generating apparatus 10 includes support member 12 and slidable support 15, wherein slidable support 15 is disposed over support member 12 on a plurality of free turning wheels 29. Slidable support 15 is attached to piston-cylinder structure 21 such that slidable support 15 can be pushed and pulled along support member 12 on free turning wheels 29.

Turbine unit 14 is shown in FIG. 1 as elongated watertight tank 34. Tank 34 includes rotating drum 38A having main shaft 36. Tank 34 is surrounded externally by wide belt 44 or, alternatively, wide chain 54. Paddles 58 are mounted on wide belt 44 or wide chain 54. Paddles 58 rotatably engage with the water flow in one direction only. Therefore, paddles 58 provide a resistance to the flow of water when they reach the lower portion of tank 34, and provide no resistance to the water flow when they reach the upper portion of tank 34. Rotating drum 38A is fixedly attached to support lever 43 which holds rotating drum 38A. An intermediate point of support lever 43 is pivotally coupled to slidable support 15. Power generating mechanism 16, such as a generator, and triangular support frame 17 are fixedly disposed on the portion of support lever 43 located distally from rotating drum 38A. Power generating mechanism 16 may also be installed inside tank 34. As shown in FIG. 1, power generating mechanism 16 is driven by transmission belt 42 wrapped around pulley 46 which in turn is coupled to rotating drum 38A. It should be apparent to one of skill in the art that a chain and spoke wheel can be used in place of transmission belt 42 and pulley 46 to achieve that same function. A second rotating drum 38B is provided at the end of tank 34 opposite the end containing rotating drum 38A. Rotating drum 38B is used to facilitate the movement of wide belt 44 or wide chain 54 over tank 34 or may be coupled to an additional power generating mechanism 16 as described above.

Extendable ram 45 is interconnected at one end to triangular support frame 17 and at the other end to slidable support 15. Extendable ram 45 may be a piston-cylinder engaged with a hydraulically actuated system. Similarly, extendable ram 41 is interconnected at one end to tank 34 and at the other end to slidable support 15. Thus, extendable rams 41 and 45 can be selectively actuated in addition to hydraulic cylinders 130A through 130D to permit optimal placement of power generation apparatus 10 in the direction of water flow.

Figure 2:
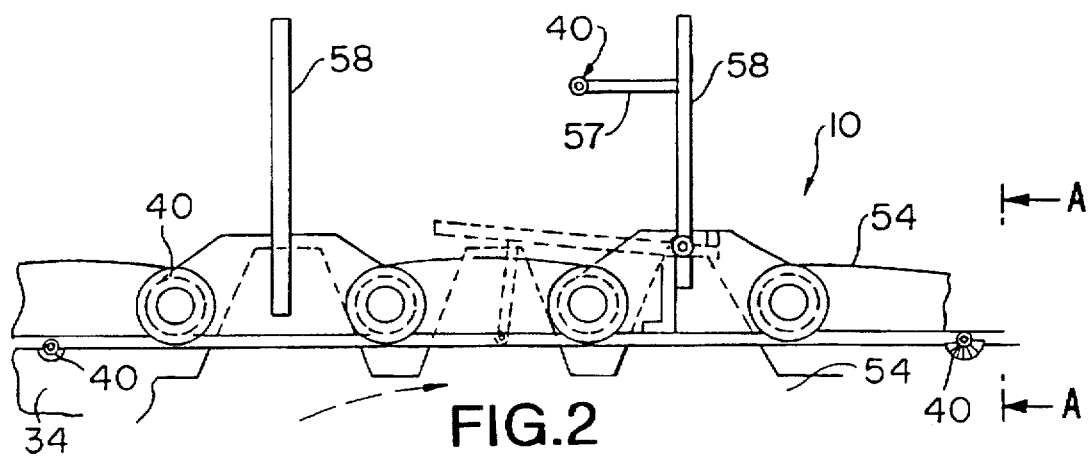
FIG. 2 is a detailed view of the chain drive of FIG. 1.
Figure 3:
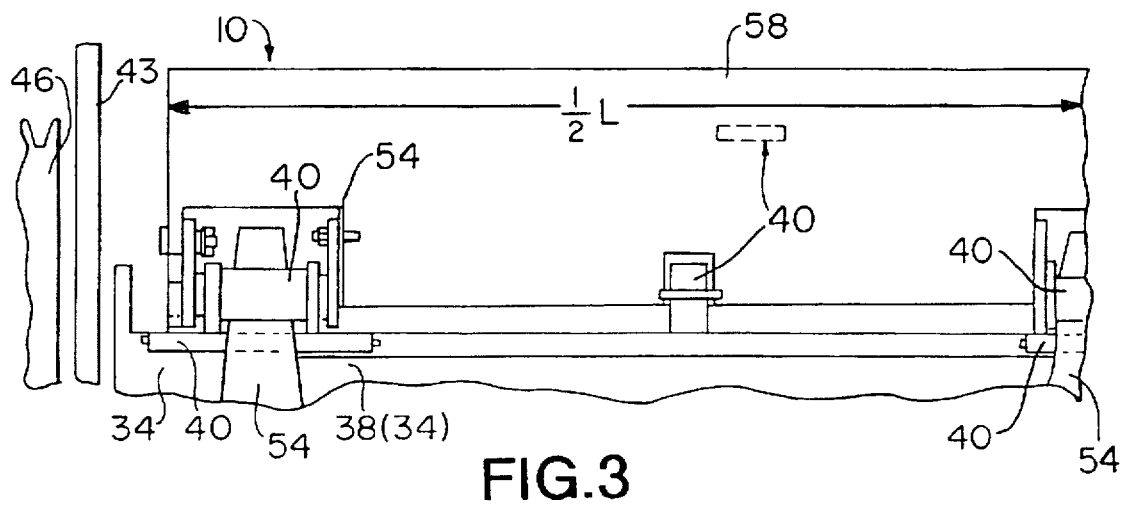
FIG. 3 is a cross sectional view along lines A—A of FIGS. 1 and 2.
Figure 4:
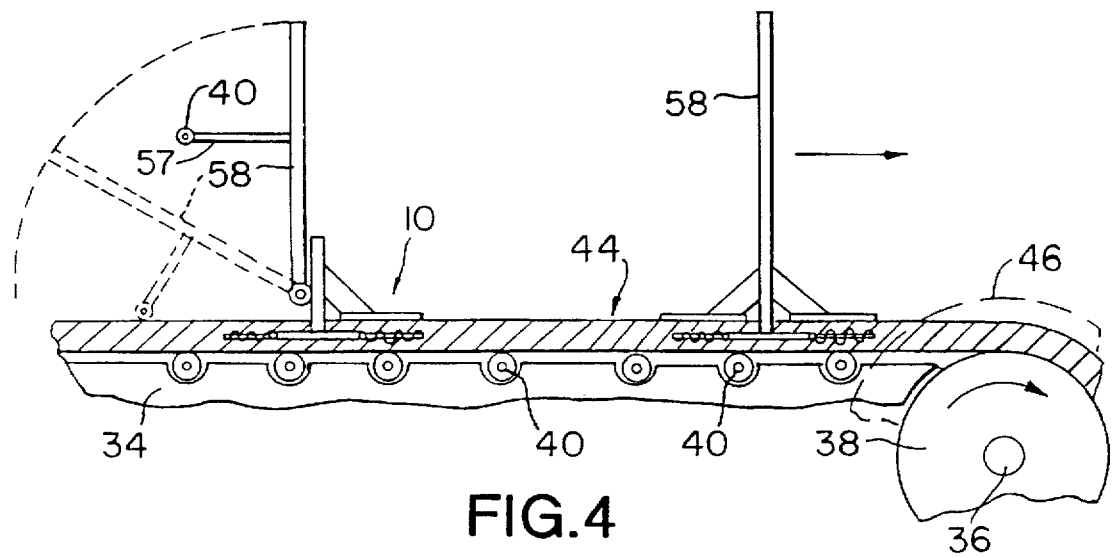
FIG. 4 is a detailed view of the belt drive of FIG. 1.

FIGS. 2–4 illustrate the operation of paddles 58, which are pivotable in a counterclockwise direction only. Thus, as illustrated in FIG. 1, when paddles 58 are in the lower portion of tank 34, the water flow impacts paddles 58 in the clockwise direction and paddles 58 cannot pivot. However, when paddles 58 are in the upper portion of tank 34, paddles 58 pivot to provide minimum resistance to wind. Each paddle 58 may have cross branch 57 with roller 40 at its end. Thus, wide belt 44 or wide chain 54 with paddles 58 will move easily around tank 34 and over free turning rollers 40 to drive rotating drum 38A, which in turn drives power generating mechanism 16.

Figure 5:
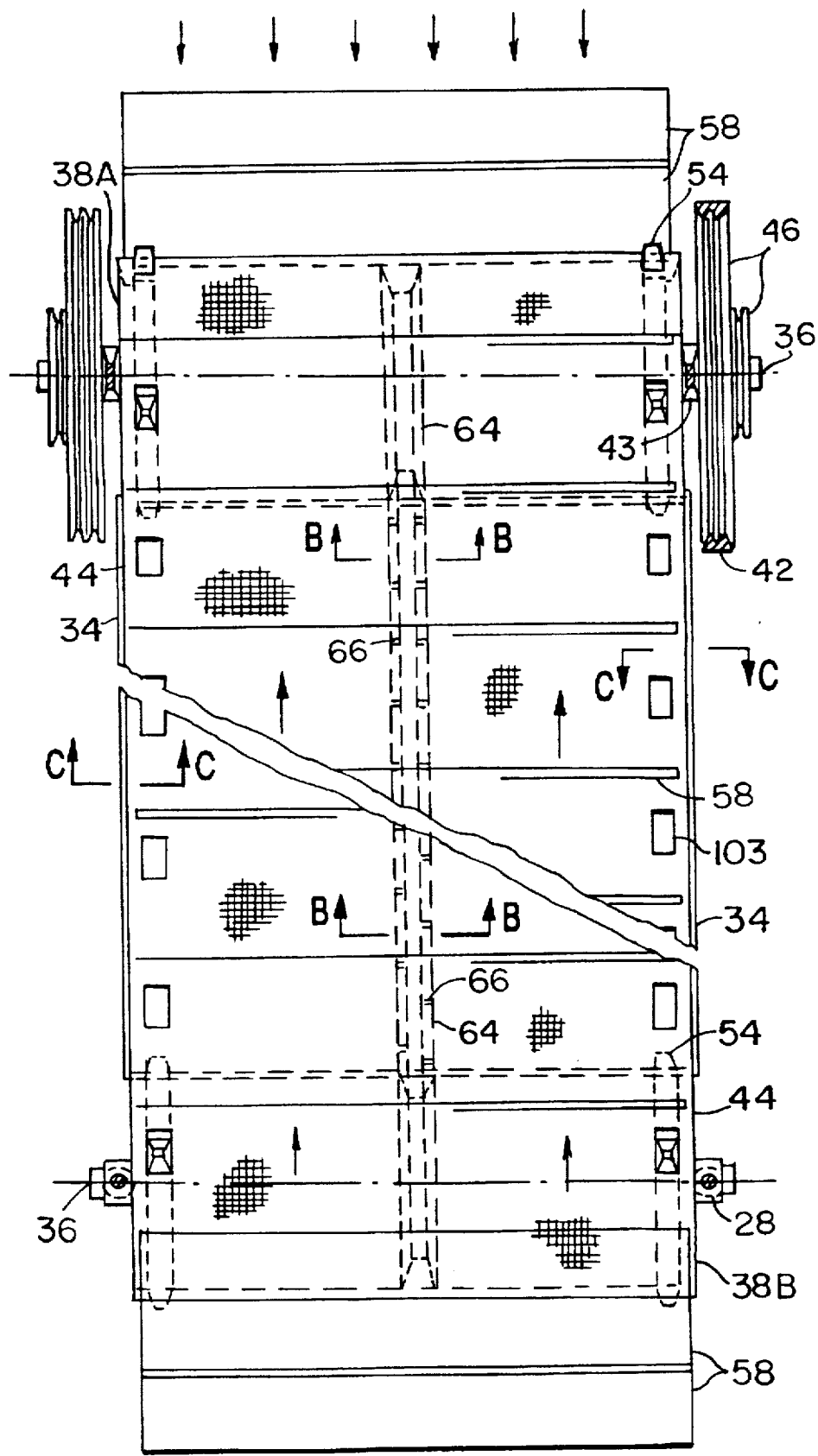
FIG. 5 is a top plan view of the system illustrating how the wide belt may be affixed to the tank.
Figure 6:
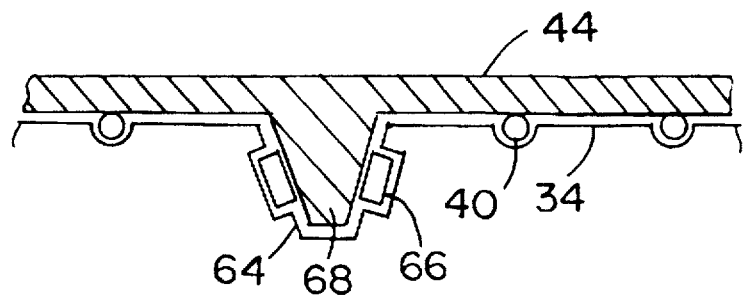
FIG. 6 is a cross sectional view along lines B—B of FIG. 5 of one embodiment for preventing lateral sliding of the wide belt.
Figure 7:
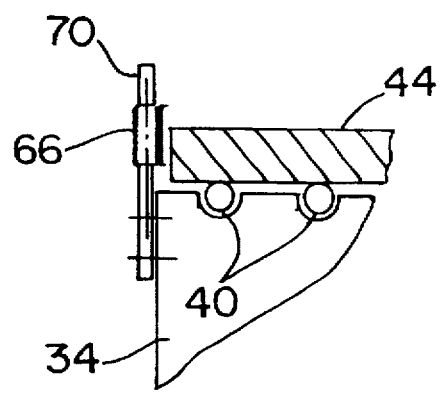
FIG. 7 is a cross sectional view along lines C—C of FIG. 5 of an alternative embodiment for preventing lateral sliding of the wide belt.

Referring to FIGS. 5–7, when wide belt 44 is used, as opposed to wide chain 54, it is preferable to restrict wide belt 44 as it moves along tank 34 so as to avoid lateral sliding. One embodiment for restricting wide belt 44 is shown in FIGS. 5 and 6. Groove 64 is placed in the surface of tank 34 as shown. Rollers 40 are placed on the surface of tank 40 adjacent groove 64 and cylindrical rollers 66 are placed within the interior walls of groove 64. Wide belt 44 is provided with radial extension 68 that fits into groove 64. Thus, such a configuration prevents wide belt 44 from shifting laterally along the surface of tank 34 while allowing wide belt 44 to travel along the surface of tank 34 with minimum friction. Rotating drums 38A and 38B also contain groove 64 but do not have rollers 40, thereby preventing wide belt 44 from shifting laterally while actually improving the friction necessary for the transfer of power to power generating mechanism 16. In addition, to further prevent lateral shifting, slots 103 may be provided in wide belt 44 to engage spokes 54 which are fixedly attached to rotating drums 38A and 38B. In an alternative embodiment, as shown in FIG. 7, barriers 70 having cylindrical rollers 66 mounted therein are mounted along the edge of tank 34. Barriers 70 and cylindrical rollers 66 will prevent lateral sliding of wide belt 44 by frictionlessly deflecting wide belt 44 along the proper path.

Figure 8:
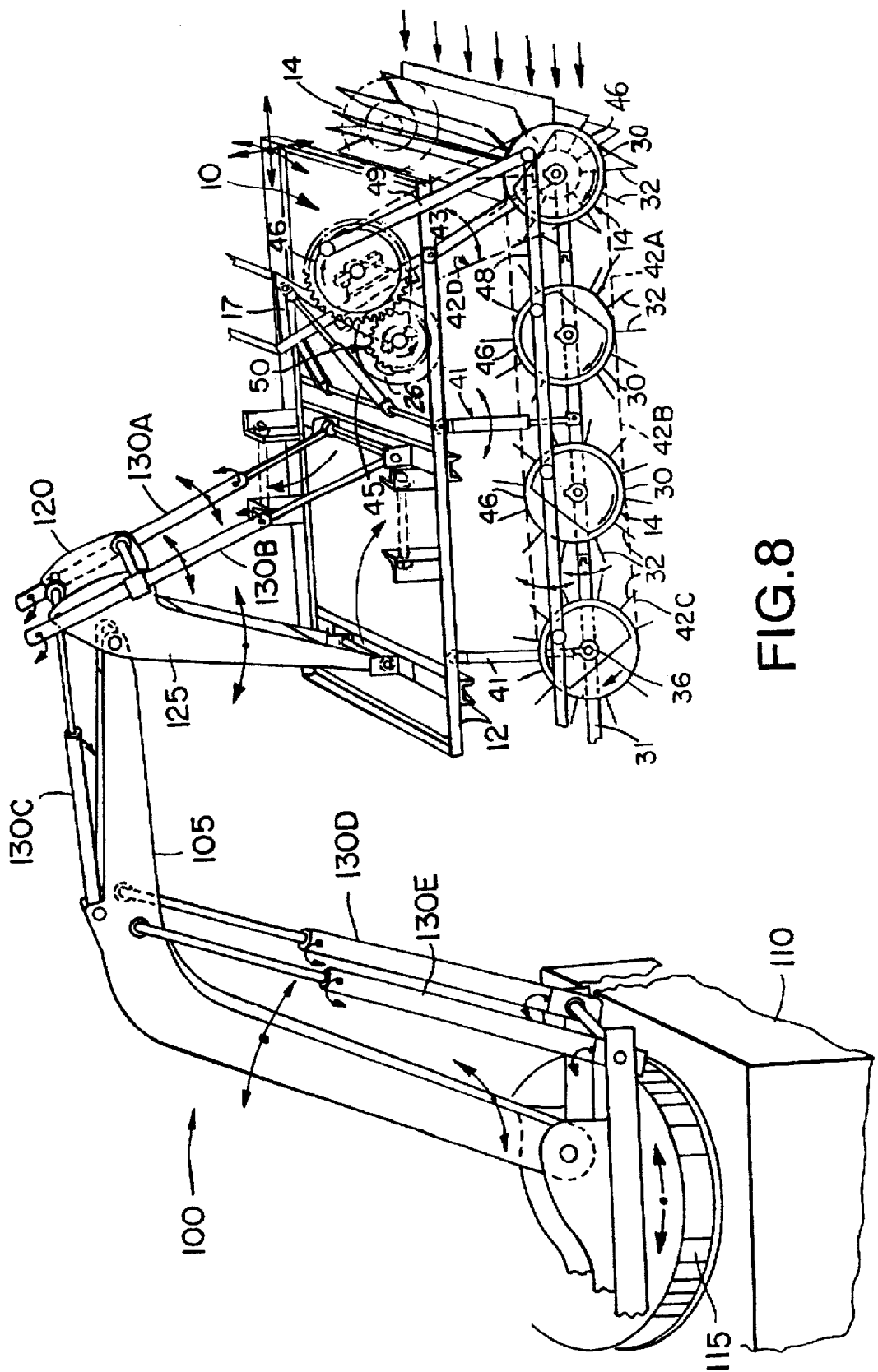
FIG. 8 is a perspective view of an alternative embodiment of the present invention.

Referring to FIG. 8, an alternative embodiment of power generating apparatus 10 is shown connected to support structure 100. Power generating apparatus 10 includes support member 12 having a plurality of turbines 14 rotatably mounted thereon in a manner to be described below. Turbines 14 are activated by the movement of the ocean waves.

Each of turbines 14 comprise a water wheel 30 having external paddles 32, rotating with a main shaft 36. Turbines 14 are connected to one another at main shaft 36 by connecting rod 31. Connecting rod 31 is connected to support member 12 through extendable rams 41, which may be a piston-cylinder system. One of the turbines 14 is further connected to one end of support lever 43 as shown in FIG. 8. An intermediate point of support lever 43 is pivotally coupled to support member 12. Water pump 26 and triangular support frame 17 are fixedly disposed on the portion of support lever 43 located distally from turbine 14. Extendable ram 45 is interconnected at one end to triangular support frame 17 and at the other end to support member 12.

Horizontal crankshaft drive 48 is coupled to turbines 14 as shown in FIG. 8. Vertical crankshaft drive 49 is coupled to horizontal crankshaft drive 48 at one end and to water pump 26 through pulley 46 and gear mechanism 50 at the other end. Alternatively, turbines 14 may be coupled through transmission belts 42A, 42B and 42C as shown. Further, turbine 14 connected to support lever 43 may be coupled to pulley 46 and gear mechanism 50 through another transmission belt 42D. Again, a chain and spoke wheel arrangement could be substituted for the transmission belt and pulley arrangement to achieve the same function. Thus, in either embodiment, the rotating movement of turbines 14 may be used to drive water pump 26 such that ocean water may be pumped into a reservoir or the like for later use in hydroelectric power generation. It should be apparent to one of skill in the art that power generating mechanism 16 could be readily substituted for water pump 26 in the above described embodiment for direct power generation.

Figure 9:
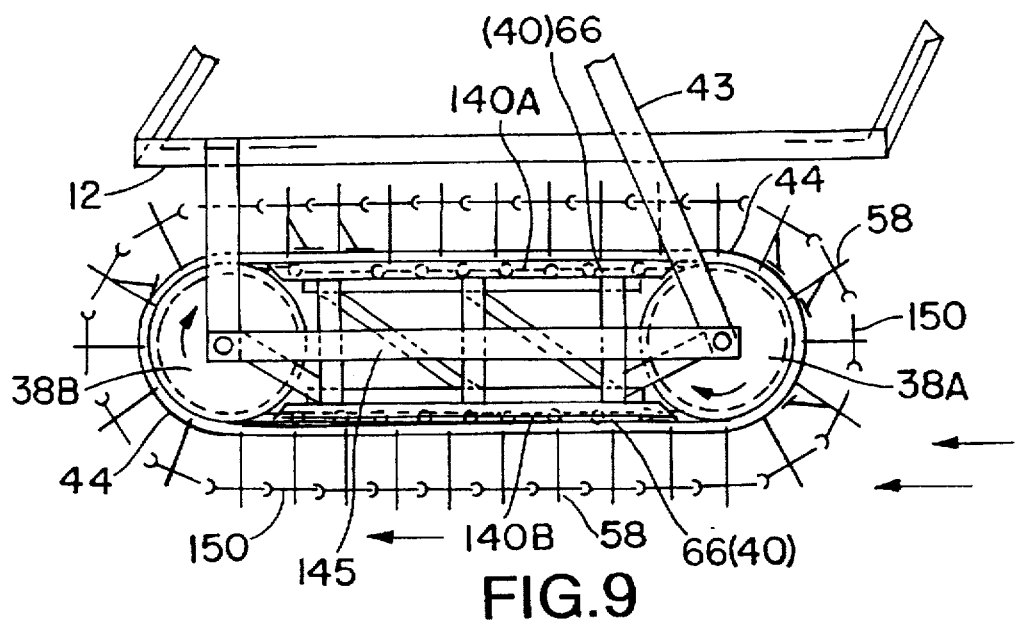
FIG. 9 is a side view of a further alternative embodiment of the present invention.
Figure 10:
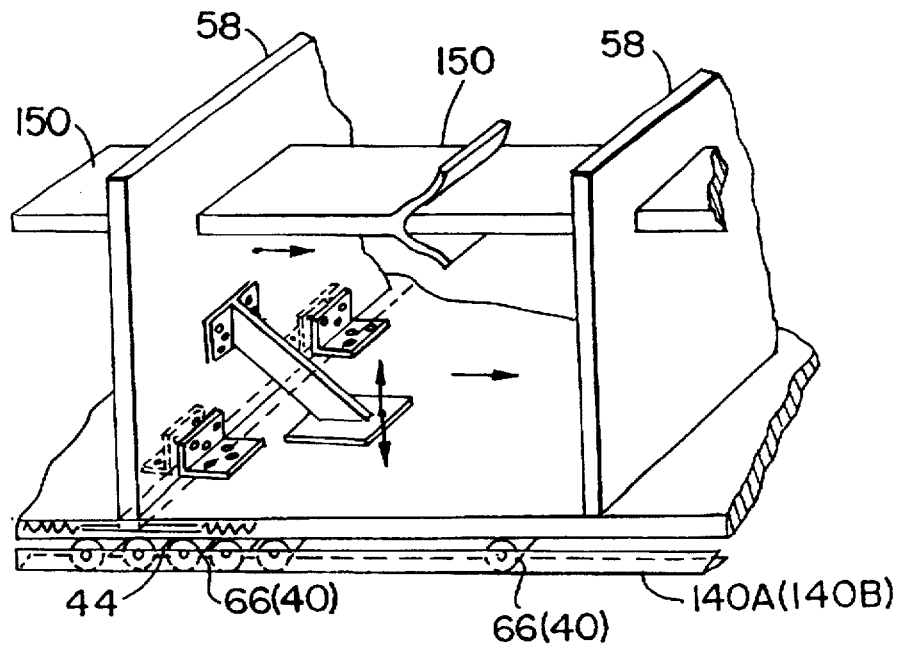
FIG. 10 is a perspective side view of the paddles in one embodiment of the present invention.

Still a further alternative embodiment of power generating apparatus 10 is shown in FIGS. 9 and 10. Conveyor 140A is mounted in two sections on the top of support structure 145. Similarly, conveyor 140B is mounted in two sections on the bottom of support structure 145. Each section of conveyor 140A and 140B comprises a plurality of adjacent rows of cylindrical rollers 66 wherein cylindrical rollers 66 are mounted in series. Ball type rollers 40 can be used instead of cylindrical rollers 66 in each section of conveyors 140A and 140B. The two sections of conveyors 140A and 140B are mounted such that a space remains therebetween for receipt of radial extension 68 of wide belt 44 as was previously shown in FIG. 6. In other words, the space is used in place of groove 64. Rotating drums 38A and 38B are rotatably affixed to support structure 145 as shown in FIG. 9. Furthermore, as was previously shown in FIG. 5, rotating drums 38A and 38B contain groove 64 for receipt of radial extension 68 of wide belt 44. Paddles 58 are shown in FIG. 9 and FIG. 10 having cross male and female branches 150. Cross male and female branches 150 will engage adjacent paddles 58 together as waves strike paddles 58 on the lower portion of power generating apparatus 10, thereby causing more efficient transfer of power from the wave to paddles 58 and wide belt 44. It should be apparent to one of skill in the art that rotating drums 38 could be coupled to either power generating mechanism 16 or water pump 26 as shown in FIGS. 1 and 8 in connection with prior embodiments of the present invention.

While presently preferred embodiments of the invention have been disclosed, it is to be understood that the invention is not limited thereto but may be otherwise embodied and practiced within the scope of the following claims.

What is claimed is:

1. An apparatus for extracting power from waves produced by a body of water, comprising:

(a) a support structure disposed on a base, said support structure comprising a turntable rotatably attached to said base, a mechanical boom having a first end and a second end, said first end being attached to said turntable, said second end being attached to a moveable mounting means, at least one hydraulic cylinder connected between said mechanical boom and said base, and at least one hydraulic cylinder connected between said mechanical boom and said moveable mounting means;

(b) a support means attached to said moveable mounting means;

(c) a turbine unit mounted on said support means and rotatably engaged with said waves, wherein said turbine unit comprises:

a support structure having a top and a bottom, a first conveyor mounted on said top of said support structure, said conveyor comprising a plurality of adjacent rows of rollers wherein said rollers are mounted in series, a second conveyor mounted on said bottom of said support structure, said conveyor comprising a plurality of adjacent rows of rollers wherein said rollers are mounted in series, a first rotating drum rotatably attached to a first end of said support structure, and a second rotating drum rotatably attached to a second end of said support structure, a wide belt surrounding said first and second conveyors and said first and second rotating drums, said wide belt being moveable over said first and second conveyors, and a plurality of paddles affixed to said wide belt for engagement with said waves, wherein said paddles comprise cross male and female branches such that said cross male and female branches will engage adjacent paddles together as said waves strike said paddles; and (d) a power generating mechanism coupled to said turbine unit through a transmission mechanism for receiving a rotational movement of said turbine unit;

wherein by selectively rotating said turntable, actuating said hydraulic cylinders and moving said moveable mounting means, said turbine unit is placed in an optimal position in said body of water for the extraction of power therefrom.

2. An apparatus according to claim 1, wherein said moveable mounting means comprises:

(a) a mounting arm having a first end and a second end, said first end being attached to said support means, said second end being rotatably attached to said mechanical boom; and (b) at least one hydraulic cylinder attached between said second end of said mounting means and said support means.

3. An apparatus according to claim 1, wherein said base is concrete.

4. An apparatus according to claim 1, wherein said base is a vehicle.

5. An apparatus according to claim 1, wherein said turbine unit comprises a plurality of water wheels externally surrounded by a plurality of paddles for engagement with said waves, said plurality of water wheels being interconnected by a coupling means.

6. An apparatus according to claim 5, wherein said coupling means comprises a crankshaft.

7. An apparatus according to claim 5, wherein said coupling means comprises a plurality of transmission belts.

8. An apparatus according to claim 1, wherein said transmission mechanism comprises a transmission belt.

9. An apparatus according to claim 8, wherein said transmission mechanism further comprises a pulley coupled to said transmission belt.

10. An apparatus according to claim 1, wherein said transmission mechanism comprises a crankshaft.

11. An apparatus according to claim 10, wherein said transmission mechanism further comprises a gear mechanism coupled to said crankshaft.

12. An apparatus according to claim 1, wherein said turbine unit comprises an elongated water tight tank having a rotating drum rotatable around a main shaft, said tank being externally surrounded by a wide belt having a plurality of paddles mounted thereon, said wide belt being moveable in a direction opposite to a direction of said waves over a plurality of free turning rollers mounted on an external surface of said tank.

13. An apparatus according to claim 12, wherein said free turning rollers are cylindrical rollers.

14. An apparatus according to claim 12, wherein said free turning rollers are ball type rollers.

15. An apparatus according to claim 12, further comprising means for restricting the movement of said wide belt to prevent a sliding thereof in a direction perpendicular to said direction of said waves.

16. An apparatus according to claim 15, wherein said restricting means comprises:

(a) a groove placed in said external surface of said tank having a pair of interior walls;

(b) a plurality of free turning rollers mounted adjacent to said groove;

(c) a plurality of free turning rollers mounted on said interior walls; and (d) a radial extension provided on said wide belt, said radial extension being fit inside said groove.

17. An apparatus according to claim 16, wherein said free turning rollers are ball type rollers.

18. An apparatus according to claim 16, wherein said free turning rollers are cylindrical rollers.

19. An apparatus according to claim 16, wherein said restricting means further comprises a groove provided in an external surface of said rotating drum, said groove being sized such that said radial extension may be fit inside said groove.

20. An apparatus according to claim 15, wherein said restricting means comprises:

(a) a plurality of spokes attached to an external surface of said rotating drum; and (b) a plurality of slots provided in said wide belt, said slots temporarily engaging said spokes as said wide belt moves over said external surface of said tank.

21. An apparatus according to claim 15, wherein said restricting means comprises a plurality of barriers mounted along an external edge of said external surface of said tank, said plurality of barriers having a free turning roller mounted therein.

22. An apparatus according to claim 1, wherein said base is located out of said body of water.

23. An apparatus according to claim 1, wherein said first conveyor and said second conveyor each comprises a plurality of sections, said sections being spaced from one another such that a radial extension provided on said wide belt will fit therebetween.

* * * * *